United States Patent [19]

Craun

[11] Patent Number: 5,733,970
[45] Date of Patent: Mar. 31, 1998

[54] AQUEOUS DISPERSED, EPOXY CROSSLINKED MALEATED OIL MICROGEL POLYMERS FOR PROTECTIVE COATINGS

[75] Inventor: Gary P. Craun, Berea, Ohio

[73] Assignee: The Glidden Company, Cleveland, Ohio

[21] Appl. No.: 790,317

[22] Filed: Jan. 28, 1997

[51] Int. Cl.⁶ .................................................. C08L 37/00
[52] U.S. Cl. ........................... 524/811; 523/403; 523/426
[58] Field of Search ........................... 524/811; 523/403, 523/426

[56] References Cited

U.S. PATENT DOCUMENTS

| | | | |
|---|---|---|---|
| 3,855,163 | 12/1974 | Bussell | 260/18 EP |
| 5,554,671 | 9/1996 | Craun et al. | 523/408 |

*Primary Examiner*—Joseph L. Schofer
*Assistant Examiner*—Wu C. Cheng
*Attorney, Agent, or Firm*—Thomas M. Schmitz

[57] ABSTRACT

An aqueous protective coating composition particularly useful for can coatings based on a polymeric binder comprises water dispersed diepoxide crosslinked microgel particles. The microgel polymer is produced by disposing in water a carboxyl functional, addition polymer modified, maleated glyceride oil copolymer and crosslinking aqueous disposed carboxyl copolymer with a low molecular weight diepoxide to form stable aqueous disposed microgel particles. The maleated glyceride oil can be modified by in-situ polymerizing ethylenic monomers with the maleated glyceride oil in the absence of water or in water to form either a water dispersed copolymer or an aqueous emulsion copolymer. The water disposed copolymer is subsequently heat reacted with diepoxide mixed with the copolymer to form aqueous dispersed microgel polymer particles.

17 Claims, No Drawings

AQUEOUS DISPERSED, EPOXY CROSSLINKED MALEATED OIL MICROGEL POLYMERS FOR PROTECTIVE COATINGS

This invention pertains to aqueous dispersed, zero VOC, maleated fatty acid glyceride esters modified with copolymerized ethlenic monomers to produce carboxyl functional copolymers adapted to be crosslinked with low molecular weight diepoxide to produce aqueous microgel polymeric binders useful for protective surface coatings and particularly useful as can coatings for beverage and food containers.

BACKGROUND OF THE INVENTION

Industrial coatings are surface protective coatings (paint coatings) applied to substrates and typically cured or crosslinked to form continuous films for decorative purposes as well as to protect the substrate. A protective coating ordinarily comprises an organic polymeric binder, pigments, and various paint additives, where the polymeric binder acts as a fluid vehicle for the pigments and imparts theological properties to the fluid paint coating. Upon curing or crosslinking, the polymeric binder hardens and functions as a binder for the pigments and provides adhesion of the dried paint fill to the substrate. The pigments may be organic or inorganic and functionally contribute to opacity and color in addition to durability and hardness. Protective coatings which contain little or no opacifying pigments are described as clear coatings. The manufacture of protective coatings involves the preparation of a polymeric binder, mixing of component materials, grinding of pigments in the polymeric binder, and thinning to commercial standards.

Epoxy resins are particularly desirable for use in protective surface coating materials as a vehicle or polymeric binder for the pigments, fillers, and other additives, where the epoxy resins advantageously provide toughness, flexibility, adhesion, and chemical resistance. Water-dispersed coating compositions containing epoxy resins are highly desirable for can coating compositions and particularly useful for interior surfaces of containers. Coatings for soft drink and beer cans, for instance, are critical due to taste sensitivity wherein such can coatings must not alter the product taste of beverages in the containers. Taste problems can occur in a variety of ways such as by leaching of coating components into the beverage, or by absorption of flavor by the coating, or sometimes by chemical reaction, or some combination thereof.

Epoxy based can coatings comprising a carbon grafted acrylic chain are disclosed is commonly assigned U.S. Pat. No. 4,212,781 which teaches a carbon grafting process involving solvent polymerization at moderate temperatures with high levels of peroxide initiator to produce a carbon-graft polymer. The high solvent levels, however, invariably carry over to the aqueous dispersion when the resulting polymers are dispersed into water to produce a VOC (volatile organic compounds) level considerably above 2 and typically between 3 and 4 pounds volatile organic compounds per gallon of resin solids. The acrylic grafted epoxy is particularly useful when utilized with a coreactive crosslinking melamine crosslinker.

Aqueous coating compositions based on microgel resin reaction product obtained by the esterification reaction of epoxy resin with carboxyl group containing vinyl polymer are disclosed in U.S. Pat. No. 4,897,434 where major amounts of high molecular weight epoxy are esterified in organic solvent with the carboxyl vinyl polymer to produce a non-gelled epoxy ester. The epoxy ester is subsequently dispersed into water followed by further coreacting of available epoxy and carboxyl groups on the preformed epoxy ester to form a microgel product. In commonly assigned U.S. Pat. No. 5,508,325, aqueous dispersed microgel polymers are produced by dispersing carboxyl functional acrylic-epoxy copolymer resin into water followed by dispersion of diepoxide and then crosslinking of the carboxyl copolymer by the diepoxide. Similar aqueous dispersed diepoxide crosslinked microgel polymeric compositions are described in related U.S. Pat. Nos. 5,464,885, U.S. Pat. No. 5,554,671, 5,526,630, and 5,526,361.

It now has been found that excellent aqueous dispersed protective coating compositions exhibiting improved film integrity properties can be prepared based on a polymeric binder comprising a carboxyl functional maleated fatty acid glyceride (oil) modified by in-situ addition polymerized ethylenic monomer, preferably styrene or styrene mixture, to form a carboxyl copolymer dispersed in water and crosslinked with low molecular weight diepoxide to form aqueous dispersed microgel polymer particles. The maleated oil copolymer is preformed maleating the oil in the absence of organic solvent and water to first form a carboxyl functional maleated oil adduct. The adduct can be modified by in-situ copolymerization of monomers in the absence of organic solvent and water followed by dispersing water to form a water dispersed copolymer, or alternatively, the adduct can be modified by dispersing the adduct into water and modifying by aqueous in-situ copolymerization of styrene to produce an aqueous emulsion copolymer. Liquid diepoxide is added to the water dispersed or the emulsion modified oil copolymer and the mixture heated for sufficient time to permit crosslinking between the carboxyl functionalities and the diepoxide resin to form aqueous dispersed microgel copolymers useful as binders in protective coatings.

In accordance with the process of this invention, water dispersed zero VOC microgel polymer particles with good film forming properties can be prepared with maleated oil such as linseed or soybean oils, where the maleated oil adduct can be rendered carboxyl functional, overpolymerized with ethylenic monomer, and crosslinked with diepoxide while disposed in water. The maleated oil adduct can be copolymerized neat with ethylenic monomer and then dispersed into water, or alternatively, the adduct can be dispersed into water and then emulsion copolymerized with monomer. In either case, the ethylenic monomer reacts with double bonds existing in the maleated oil. Diepoxide is dispersed into the water dispersed or the emulsion modified oil adduct and subsequently crosslinked with the carboxyl functionality on the adduct to increase the crosslink density and form water dispersed microgel particles. Organic solvents can be advantageously avoided completely in the entire synthesis process if desired. Vegetable oils are a renewable source and hence are environmentally preferred raw materials. The paint films produced from the polymeric microgel polymer particles exhibit excellent water resistance along with clear glossy protective films low in color. When the paint films are baked, the dispersion polymers further react where the microgel polymer particles cure together by an esterification reaction to yield a tough water resistant cured paint film. These and other advantages of this invention will become more apparent by referring to the detailed description of the invention and the illustrative examples.

SUMMARY OF THE INVENTION

Briefly, the invention pertains to aqueous dispersed protective coating compositions comprising a polymeric binder containing very low or preferably zero levels of organic solvents produced by forming a carboxyl functional maleate oil adduct, subsequently modified with in-situ polymerized ethylenic monomer, and crosslinked by diepoxide while disposed in water. The carboxyl functional copolymer is crosslinked with the diepoxide to provide stable water dispersed microgel polymer particles useful as a polymeric binder in paint coatings. The crosslinked aqueous dispersed microgel polymers comprise by weight between 5% and 95% fatty acid glyceride, between 1% and 50% coreacted maleate, between 1% and 80% copolymerized styrene, with balance being crosslinking diepoxide.

In accordance with the process of this invention, a maleated oil adduct is produced in the absence of water and organic solvent followed by in-situ monomer copolymerization and subsequently dispersed into water to produce a water dispersed copolymer, or alternatively the adduct is dispersed into water and then copolymerized by in-situ monomer copolymerization to produce an emulsion copolymer, whereupon the water dispersed or emulsion modified adduct is heat reacted with dispersed low molecular weight diepoxide to produce water dispersed microgel polymer particles.

DETAILED DESCRIPTION OF THE INVENTION

The aqueous dispersed microgel polymer of this invention is based on a carboxyl functional maleated oil adduct copolymerized with ethylenic monomer to produce an addition polymer modified adduct, which is maintained in an aqueous phase and crosslinked with low molecular weight diepoxide to produce aqueous dispersed microgel polymer particles.

Useful fatty acid glycerides are esters of glycerol and fatty acid having an alkyl fatty acid chain of 8 to 24 carbon atoms with one or more double bonds. The fatty acid glycerides are preferably triglycerides but may include minor amounts of monoglycerides and diglycerides. Preferred triglycerides are unsaturated glyceride oils commonly known as vegetable oils and generally referred to as drying oils or semidrying oils. Typical drying oils include linseed oil, tung oil, oiticica oil, perilla oil, while typical semidrying oils include dehydrated caster oil, tall oil, soya bean oil, and safflower oil. Useful triglycerides and diglycerides have identical fatty acid chains, such as triglycerides commonly known as stearin (stearic acid), or palmitin (palmitic acid), or alternatively can contain different fatty acid chains attached to the same glycerol molecule. Double bond unsaturation in fatty acid glycerides is commonly measured by iodine value (number) which indicates the degree of double bond unsaturation in the fatty acid chain or chains. Sufficient double bond unsaturation in the fatty aid chains is necessary to allow maleation to occur and form a maleated oil adduct at a level sufficient to provide enough carboxyl groups for dispersing into water. The iodine value is the grams of iodine absorbed by 100 grams of fat determined by adding a known quantity of iodine chloride to a known weight of glyceride dissolved in chloroform and letting the mixture stand in the dark for about two hours. The unreacted iodine is then determined by titration with sodium thiosulfate to determine the iodine value. Unsaturated fatty acid glycerides useful in this invention have an iodine value between 10 and 250, where higher double bond levels are preferred.

Naturally occurring fatty acid glycerides in vegetable oils, a renewable raw material source, ordinarily are not pure compounds but instead are mixtures of fatty acid chains in the form of glyceride esters comprising a distribution of fatty acid esters of glyceride, where the fatty acid distribution may be random but within an established range that may vary depending on the growing conditions of the vegetable oil source. Soybean oil for instance ordinarily comprises by weight approximately 11% palmitic, 4% stearic, 25% oleic, 51% linoleic, and 9% linolenic fatty acids, more or less, where oleic, linoleic and linolenic are unsaturated fatty acids of the glyceride esters. Similarly, linseed oil ordinarily comprises by weight approximately 52% linolenic, 22% oleic, 16% linoleic, 6% palmitic, 4% stearic oils. Accordingly, useful unsaturated vegetable oils are those glyceride oils containing sufficient amounts of fatty acid glyceride esters of lauroleic, myristoleic, palmoleic, oleic, rincinoleic, linoleic, linolenic, eleostearic, eruic and licanic or similar fatty acid chains. The preferred commercial vegetable oils contain one or more unsaturated glyceride oils including corn oil, cottonseed oil, grapeseed oil, hempseed oil, linseed oil, wild mustard oil, oticica oil, olive oil, palm oil, peanut oil, perilla oil, poppyseed oil, rapseed oil, safflower oil, sesame oil, soybean oil, sunflower oil, tall oil, and tung oil. Synthesized glyceride esters containing one or more of the above unsaturated fatty acids provide useful unsaturated fatty acid glyceride esters in accordance with this invention. Useful fatty acid esters of glyceride have between 8 and 24 carbon atoms and an iodine value between 10 and 250.

In accordance with this invention, the unsaturated fatty acid esters of glyceride are maleated (maleinized) with maleic anhydride at temperatures between about 100 to 250 degrees C. to form a maleate adduct of fatty acid glyceride. The reaction is under dry conditions in a nitrogen atmosphere to produce low color resins and high yield reactions. Preferred maleic anhydride to oil weight ratios should be from about 1:10 to 1:2. The malenization reaction of the maleic double bond and a double bond in the fatty acid ester glyceride proceeds relatively quickly with conjugated fatty acid chains by heating together in the absence of organic solvent and water at temperature above about 80 degrees C. and preferably between 100 to 250 degrees C. to form a Diels-Alder adduct. The reaction of maleic anhydride with non-conjugated chains requires higher temperatures preferably between 180 and 250 degrees C. Mono-unsaturated fatty acid chains can add the maleate by reaction with active methylene groups to form substituted fatty acid adducts. Blends of conjugated and non-conjugated fatty acid chains are desirable to control the maleation reaction with the maleic anhydride. On a weight basis, useful maleated glyceride adducts contain between about 5% and 60% coreacted maleic anhydride, preferably between 10% and 35%, to produce a maleated oil adduct having an Acid No. between about 25 and 400 and preferably between 40 and 300 mg KOH per gram of resin.

In accordance with a preferred aspect of this invention, the maleated oil adduct is further reacted with ethylenic monomer, where the preferred monomer is styrene alone or styrene with lesser amounts of other ethylenic monomer, and the monomer is polymerized in-situ with the maleated adduct in the absence of organic solvent or water. Other ethylenic unsaturated monomers contain carbon to carbon double bond unsaturation and generally include vinyl monomers, substituted styrene monomers, acrylic monomer, allylic monomers, acrylamide monomers, and minor amounts of cyclic monomers such as cyclopentadiene. Vinyl monomers include vinyl esters such as vinyl acetate, vinyl propionate and similar vinyl lower alkyl esters, vinyl aromatic hydrocarbons such as vinyl toluene and substituted styrenes, vinyl aliphatic monomers such as alpha olefins, and vinyl alkyl ethers such as methyl vinyl ether and similar vinyl lower alkyl ethers. Acrylic monomers include lower alkyl esters of acrylic or methacrylic acid having an alkyl ester chain from one to twelve carbon atoms as well as aromatic derivatives of acrylic and methacrylic acid. Useful acrylic monomers include for instance methyl, ethyl, butyl, and propyl acrylates and methacrylates, 2-ethyl hexyl acrylate and methacrylate, cyclohexyl, decyl, and isodecyl acrylates and methacrylates, and similar various acrylates and methacrylates. Preferred monomer comprises styrene where the styrene content of the ethylenic monomers copolymerized with the maleated oil adduct is between 50% and 100% by weight of the monomers copolymerized.

In accordance with this invention, the maleated oil adduct can be copolymerized with styrene and other ethylenic monomer, if any, neat in the absence of organic solvent and water by in-situ copolymerization of the monomers by adding the styrene monomer to the maleate adduct at a reaction temperature between about 50 and 250 degrees C., preferably between 100 and 170 degrees C., with about 0.1% to 10% initiator based on the weight of the monomers copolymerized. Useful initiators include free radical peroxide, azo or similar free radical initiators. Useful peroxides include hydrogen peroxide, t-butyl hydroperoxide, di-t-butyl peroxide, benzoyl peroxide, 2,4-dichlorobenzoyl peroxide, t-butyl peracetate, azobisisobutronitrile, dicumyl peroxide, ammonium persulfate, sodium persulfate, potassium persulfate, sodium and potassium perphosphates, or redox initiators such as persulfate sodium formaldehyde sufoxylate, cumene hydroperoxide sodium bisulfate, potassium persulfate sodium bisulfite, cumene hydroperoxide iron sulfate, and the like. The styrene and other monomer, if any, copolymerize by addition polymerization through monomer double bond polymerization as well as interpolymerize with available double bonds in fatty acid chains and/or in maleate adducts and/or other monomers. The styrenated maleated oil adduct comprises by weight between about 1% and 80% copolymerized styrene (and other monomer), between about 1% and 50% coreacted maleate, and between about 5% and 95% coreacted fatty acid glyceride in the resulting stryenated, maleated, fatty acid copolymer. Preferred levels are 5% to 30% copolymerized styrene (and other monomer), 10% to 30% maleate, with the balance being ordinarily 30% to 90% fatty acid glyceride. The Acid No. of the addition polymer modified maleated oil copolymer should be between 30 and 400 with a number average molecular weight between 900 and 50,000 as measured by GPC.

In accordance with this aspect of the invention, the addition copolymer modified maleated oil copolymer formed in the absence of organic solvent and water can be dispersed into water by reacting the copolymer with water or a low alkyl alcohol to produce carboxyl groups and render the copolymer water dispersible. The anhydride adduct of the copolymer can be opened by reacting with water at temperature around 50 to 120 degrees C., more or less. The preferred method is to react the anhydride adduct with water to open the adduct at temperatures between about 70 and 100 degrees C. Stoichiometric ratios of water or alcohol relative to the anhydride groups being opened can be used, although greater amounts are preferred. Preferred mono-alcohols are lower alkyl alcohols such as methyl, ethyl, propyl, isopropanol, t-butanol, and similar linear or branched secondary or tertiary alcohols, or less preferred higher linear or branched alkyl alcohols having up to 18 carbon atoms, to produce an alkyl ester group and a carboxyl functional copolymer. Secondary and tertiary alcohols are preferred to provide greater hydrolytic stability than primary alcohols. The resulting carboxyl functional, addition polymer modified maleated oil copolymer can be dispersed into water by partially or completely neutralizing the available carboxyl groups on the styrenated copolymer with ammonia or amine or mixtures thereof as the neutralizing base. Ammonia is the preferred neutralizing base since ammonia does not contribute to volatile VOC in the finished polymeric resin. Useful neutralizing amines include monoethanol amine, dimethyl ethanol amine, diethanol amine, triethyl amine, dimethylaniline, and similar primary, secondary and tertiary amines. Neutralization of 10% to 100% of the carboxyl functional is desired while 20% to 60% is preferred. Inversion into water is achieved by adding the aminated carboxyl copolymer to water or conversely adding mated water to the carboxyl copolymer. The mated copolymer can be dispersed into water without assistance from surfactants and with moderate low shear mixing to provide a stable aqueous dispersion containing from about 60% to 80% by weight water more or less.

In accordance with an alternative aspect of this invention, the maleated oil adduct can be first dispersed into water followed by in-situ aqueous emulsion copolymerization of ethylenic monomers to form an emulsion addition polymer maleated adduct emulsion copolymer. In this regard, the maleated oil adduct in the anhydride form can be opened as described above by reacting with water or mono-alcohol at reaction temperatures between about 50 and 120 degrees C. to produce a carboxyl functional maleated oil adduct. The carboxyl functional adduct can be neutralized with ammonia or low aliphatic amines to neutralize approximately 10% to 100% of the carboxyl groups. Ammonia is preferred to avoid VOCs. In accordance with this aspect of the invention, the water dispersed maleated adduct is overpolymerized with ethylenic monomers by in-situ aqueous emulsion copolymerization of the monomers. Suitable useful other ethylenic monomers other than styrene include vinyl monomers, substituted styrenes, acrylic monomers, allylic monomers, and acrylamides, as described above. In preferred compositions, lesser amounts between 0% and 50% of other ethylenic monomers with balance being styrene based on the weight of the monomers copolymerized are emulsion copolymerized with the carboxyl functional maleated oil adduct dispersed in water. The resulting addition polymer modified maleated oil emulsion copolymer comprises by weight between 1% and 80% copolymerized ethylenic monomer, between 1% and 50% coreacted maleate, with balance being coreacted fatty acid glyceride, where preferred levels are from 5% to 30% copolymerized ethylenic monomer, and from 5% to 30% coreacted maleate, with balance being fatty acid glyceride. The resulting emulsion copolymer should have an Acid No. between 30 and 400 and a number average molecular weight between 800 and 50,000 as measure by GPC.

In accordance with the process of this alternative aspect of the invention, the foregoing emulsion copolymer is produced by dispersing the carboxyl functional maleated oil adduct into water and copolymerized with ethylenically unsaturated monomers in an aqueous polymerization medium by adding the ethylenic monomers to water along with polymerizing initiators as well as other emulsion polymerization ingredients, although surfactants are not required. Initiators can include for example typical free radical and redox types such as hydrogen peroxide, t-butyl hydroperoxide, di-t-butyl peroxide, benzoyl peroxide, benzoylpeoxide, 2,4-dichlorbenzoyl peroxide, t-butylperacetate, azobisisobutyronitrile, ammonium persulfate, sodium persulfate, potassium persulfate, sodium and potassium perphosphates. Useful redox initiators include persulfate sodium formaldehyde sufoxylate, cumene hydroperoxide sodium metabisulfite, potassium persulfate sodium bisulfite, cumene hydroperoxide iron (II) sulfate and the like. Polymerization initiators are usually added in amounts between about 0.1 and 5 percent by weight of the monomers polymerized.

In accordance with this invention, either the water dispersed carboxyl copolymer or the aqueous emulsion carboxyl copolymer is crosslinked in the aqueous polymer phase with a diepoxide. In this regard, a low molecular weight diepoxide is added to the water dispersed copolymer, or alteratively to the emulsion copolymer, to provide crosslinking and microgel formation by heating moderately the aqueous polymeric mixture of diepoxide and carboxyl copolymer. The low molecular weight diepoxide resins useful for crosslinking the carboxyl functional water dispersed or emulsion copolymer are predominantly linear chain molecules comprising the coreaction product of polynuclear dihydroxy phenols or bisphenols with halohydrins to produce epoxy resins containing preferably two epoxy groups per molecule. The most common bisphenols are bisphenol-A, bisphenol-F, bisphenol-S, and 4,4 dihydroxy bisphenol, with the most preferred being bisphenol-A. Halohydrins include epichlorohydrin, dichlorohydrin, and 1,2-dichloro-3-hydroxypropane with the most preferred being epichlorohydrin. Preferred epoxy resins comprise the coreaction product of excess molar equivalents of epichlorohydrin with bisphenol-A to produce predominantly an epoxy group terminated linear molecular chain of repeating units of diglycidyl ether of bisphenol-A containing between 2 and 25 repeating copolymerized units of diglycidyl ether of bisphenol-A. In practice, an excess molar equivalent of epichlorohydrin are reacted with bisphenol-A to produce diepoxide epoxy resins where up to two moles of epichlorohydrin coreact with one mole of bisphenol-A, although less than complete reaction can produce difunctional epoxy resin along with monoepoxide chains terminated at the other end with a bisphenol-A unit. The preferred linear epoxy resins are polyglycidyl ethers of bisphenol-A having terminating 1,2-epoxide groups (oxirane groups) and a number average molecular weight between 200 and 10,000 and preferably from about 360 to 1,000 as measured by gel permeation chromatography (GPC). Commercially available lower molecular weight epoxy resins include Dow Chemical epoxy resins identified by trade number and average molecular weights as follows: DER 333 (380); DER 661 (1050); while Shell Chemical epoxy resins are EPON 828 (380); EPON 836 (625); EPON 1001 (1050); and Ciba-Geigy linear epoxy resins GT-7013 (1400); GT-7014 (1500); GT-7074 (2000) and GT-259 (1200). The epoxy equivalent weight should be between 100 and 5,000 while the preferred epoxy equivalent weight is between 100 and 1,000, and more preferably between 180 and 500. Higher equivalent weight and molecular weight epoxy resins do not disperse well, although epoxy blends containing minor amounts of moderately higher molecular weight epoxy resins are workable. Diepoxides include branched epoxies or polyepoxides comprising branched chains where at least two of the chains contain terminal epoxide groups. Branched diepoxides or polyepoxides having two or more terminal epoxide groups can be produced by coreacting epichlorohydrin with polynuclear polyhydroxy phenols, epoxy novalacs, trifunctional phenols, or aliphatic trifunctional alcohols.

Diepoxide resins further include non-aqueous alkylene oxide resins which are epoxide functional resins comprising an alkylene oxide adduct of a bisphenol compound. The alkylene oxide is an aliphatic alkyl derivative having up to about 26 carbon atoms although preferred oxides are lower alkyl oxides such as ethylene, propylene, and butylene oxides. Bisphenol compounds include bisphenol-A, bisphenol-F and bissulfone or sulfides. Typically two or more moles of alkyl oxide are coreacted with one mole of bisphenol compound. Preferred compositions are 2:1 molar reactions while suitable molecular weight range of alkylene oxide resins is between 200 and 10,000 where preferred molecular weights are between 200 and 1,000 as measured by GPC. Equivalent weights should be between 100 and 5,000 and preferably between 100 and 500.

After diepoxide is dispersed into the water dispersed or the emulsion copolymer, heat can be applied to increase the rate of the carboxylic acid and epoxy crosslinking reaction. Catalysts such as tertiary amines, phosphines, pyridine, and the like can be added at low levels (0.1 to 1%) to further increase the acid-epoxy reaction rate. If tertiary amine is used as a portion of the neutralizing base, up to 10% additional amine can be used. Alternatively, the acid-epoxy reaction in water can occur at room temperature over a long period of time, although this not a commercially desired process. Viscosity generally rises as the epoxy and carboxyl reaction occurs. The resulting epoxy crosslinked water dispersed or emulsion copolymer comprises an aqueous microdispersion of very small crosslinked polymer particles having a mean microgel particle size below 5 microns, desirably less than 1 micron, and preferably less than 0.5 micron size particles. The crosslinked water dispersed or emulsion copolymer provides an aqueous polymerization medium to produce water dispersed microgel polymer particles having an Acid No. above 20 and preferably between 50 and 150.

The microgel dispersions of this invention produced by crosslinking carboxyl functional water dispersed or emulsion copolymer with diepoxide surprisingly provides highly crosslinked copolymers in the form of a stable aqueous microdispersion of small internally crosslinked microgel polymer particles. Heat cured paint films exhibit excellent water resistance, good clarity and desirable gloss.

For spraying, preferably the coating composition contains between about 10% and 30% by weight polymeric solids relative to 70% to 90% water including other volatiles such as minimal amounts of solvents, if desired. For applications other than spraying, the aqueous polymeric dispersions can contain between about 10% and 40% by weight polymer solids. Organic solvents can be utilized if desired to facilitate spray or other application methods and such solvents include n-butanol, 2-butoxy-ethanol-1, xylene, toluene, and preferably n-butanol is used in combination with 2-butoxy-ethanol-1. The coating composition of the present invention can be pigmented and/or opacified with known pigments and opacifiers. For many uses, including food use, the preferred pigment is titanium dioxide. The resulting aqueous coating composition can be applied satisfactorily by conventional methods known in the coating industry. Thus, spraying, rolling, dipping, and flow coating application methods can be used for both clear and pigmented films, although spraying is preferred. After application onto the metal substrate, the coating is cured thermally at temperatures in the range from about 150° C. to 220° C. or higher for time sufficient to effect complete curing as well as volatilizing of any fugitive component therein.

For metal sheet substrates intended as beverage containers and particularly for carbonated beverages such as beer, the coating should be applied at a rate in the range from 0.5 to 15 milligrams of polymer coating per square inch of exposed metal surface. To attain the foregoing, the water-dispersible coating as applied can be as thick as 0.1 to 1 mil.

For a better understanding of the present invention, the following examples are provided. In this regard, all parts are parts by weight, all percentages are weight percentages, and temperatures are degrees Centigrade, unless otherwise expressly noted.

EXAMPLE 1

A maleated linseed oil was prepared as follows.

A. First Step. In a flask equipped with a stirrer, 600 grams of linseed oil was heated to 200 degrees C. while sparging with nitrogen at 20 inches of mercury vacuum. At 200 degree C., the vacuum was removed and the reaction temperature was held at 200 degrees C. for one hour and then cooled about 70 degree C., whereupon 151 grams of maleic anhydride was added. The reactants were heated to 225 degrees C. under nitrogen and held 1.5 hours, then cooled to 120 degrees C., whereupon 30 grams of water was added and the temperature held for 30 minutes to open the anhydride. The resulting maleated linseed oil had 20 poise ICI cone and plate viscosity at 100 degrees C. and an Acid No. of 190 mgm KOH per gram resin (88% theoretical). About 200 grams of the maleated linseed oil adduct was heated to 200 degrees F., whereupon a aqueous solution of 200 grams water with 3 grams dimethylethanol amine and 31 grams ammonia (28%) were added to invert the maleated linseed oil into water. About 566 grams of water was added to provide an aqueous dispersion of maleated linseed oil at a NVM of 20% by weight.

B. Second Step. About 250 grams of the aqueous dispersion from A was combined with 25 grams of styrene and the mixture was heated to 75 degrees C. under nitrogen, whereupon 1 gram of t-butyl perocatate was added an the reactants held at 75 degrees C. for two hours to form a styrenated maleated linseed oil. The reaction mixture was cooled to room temperature.

C. Third Step. About 137.5 grams of the dispersion (20% NVM) in B and the 15 grams of DER 333 diepoxide (eqv. wt.=380) were mixed together, heated to 90 degrees C., and held for two hours to for an aqueous dispersed microgel, whereupon the 200 grams additional water was added to reduce the viscosity of the microgel dispersion.

EXAMPLE 2

An aqueous dispersed microgel was prepared as follows.

About 250 grams of aqueous dispersion A (20% NVM) of maleated linseed from Example 1 was mixed with 15 grams of DER 333 diepoxide, heated to 90 degrees C. and held for two hours, and then cooled to room temperature. About 125 grams of the resulting epoxidized crosslinked maleated linseed oil was combined with 20 grams of styrene and the mixture heated under nitrogen to 80 degrees C., held for one hour, and then 1 gram of t-butyl perocatate was added and the reaction mixture held two hours to form an aqueous dispersed styrenated maleated linseed oil epoxy crosslinked microgel. An additional 80 grams of water was added to reduce the viscosity and the mixture was cooled to room temperature.

EXAMPLE 3

Paint coatings were from Example 1 and 2 were drawn down on aluminum panels with a #28 wire wound bar and the film were baked at 200 degrees C. for two mutes. Both films were clear, glossy and hard. The heat cured film from Example 1 was very low in color while the heat cured film from Example 2 was slightly yellow. Both cured films were untouched after being exposed to boiling water for two minutes.

Can Coating Test Results

Coating composition products from Examples 1 and 2 were spray applied to aluminum substrate interior surfaces of beverage cans at the substrate surface coverage rate of 100 to 140 mgms dried coating per can substrate, and baked at 360 degrees F. for 30 seconds peak metal temperature. Both coating compositions produced glossy, smooth, clear films. Each can was soaked in 1% Joy detergent solution at 180 degrees F. for 10 minutes. Blush was very slight to none for each cured film.

EXAMPLE 4

An aqueous dispersed styrenated glyceride oil epoxy microgel resin was prepared as follows.

In a reaction flask, 300 grams of soya oil was heated to 200 degrees C. under nitrogen purge and held for one hour. The reaction temperature was cooled to 100 degrees C., then 100 grams of maleic anhydride was added, and the mixture heated to 210 degree C. and held one-half hour, then heated to 225 degrees C. and held one hour. The reaction mixture was cooled to 172 degrees C., whereupon 50 grams styrene containing 2 grams di-t-butyl peroxide were added over one hour. The reaction mixture was held at 172 degree C. for two hours while adding an additional 0.5 grams of peroxide at 30 minutes and again at 60 minutes in hold period. The reaction was cooled to 100 degrees C., whereupon 18 grams of water was added and the mixture held at 95 degrees C. for one-half hour. A mixture of 300 grams of water, 22 grams of dimethyl amine and 40 grams ammonium hydroperoxide (23% ammonium) was added over five minutes to invert the resin into water, and the an additional 1080 grams of water was added to reduce the solids content and viscosity. At 90 degrees C., 52 grams of DER 333 liquid diepoxide was added and held for two hours to react the diepoxide with carboxyl functional styrenated maleated soya oil.

EXAMPLE 5

An epoxy novalac microgel was prepared as follows.

A styrenated maleated soya oil was prepared in the same manner as in Example 4, except that reaction temperature was cooled to 150 degrees C. and held while adding styrene. The aqueous dispersed resin was prepared from the following raw materials

| a) | 300 gams | soya oil |
| b) | 100 | Maleic anhydride |
| c) | 15 | Styrene |
|    | 0.6 | Dicumyl peroxide |
| d) | 18 | Water |
| e) | 100 | Water |
|    | 22 | Dimethylethanol amine |
|    | 40 | Ammonium hydroxide (28% ammonium) |
| f) | 1280 | Water |
| g) | 61.7 | Dow Epoxy Novalac (DEN 438) 80% in butyl cellosolve |

EXAMPLE 6

The aqueous dispersed resins of Example 4 and 5 were drawn down as films on aluminum panels with a #16 wire bound bar and the films were baked at 200 degree C. for two minutes. The baked cured films were tough, clear and glossy. The panels with cure films were placed in boiling water for five minutes. Both films exhibited no blush.

EXAMPLE 7

A water dispersed microgel was prepared as follows.

In a reaction flask, 300 grams of soya oil was heated to 200 degrees C. with nitrogen sparge, held for one hour, cooled to 150 degrees C., and then 100 grams of maleic anhydride was added. The mixture was heated to 210 degrees C. and held for one hour at 225 degrees C. The reaction mixture was cooled to 150 degrees C. and then a monomer mix of 30 grams of styrene and 30 grams methylmethacrylate containing 2.4 grams of dicumyl peroxide was added over one hour, and then held for 30 minutes. Then 0.6 grams of dicumyl peroxide was added and the reaction held for 30 minutes, whereupon additional 0.6 grams of dicumyl peroxide was added and the reaction held 30 minutes and then cooled to 95 degrees C. A water solution of 111 grams of water, 22 grams dimethylethanol amine and 10 grams of 28% ammonium hydroxide was added and held for 10 minutes. An additional 500 grams of water was added over 15 minutes while holding 90 degree C. The 79 grams of DER 333 liquid epoxy was added, held 5 minutes, and then 683 grams of water was over 15 minutes while holding 90 degrees C., and then holding 90 degrees C. for 2 hours.

EXAMPLE 8

A water dispersed microgel was prepared as in Example 7 except that the monomer mixture consisted of 60 grams of methylmethacrylate with no styrene.

Test Results for Examples 7 and 8

Coating films were prepared by drawing down films on aluminum panels with a #16 wire wound bar. The films were baked for 2 minutes at 200 degrees C. The baked film from Example 7 exhibited moderate gloss while the baked film from Example 8 was flat with no gloss and had a slight texture. Both baked films exhibited to blush after emersed in boiling water for 5 minutes.

Although the merits of this invention have been specifically described and illustrated in the examples, the invention is not intended to be limited except by the appended claims.

I claim:

1. An aqueous dispersed coating composition containing an aqueous dispersed polymeric binder, the polymeric binder comprising:

an aqueous dispersed microgel containing a carboxyl functional, addition polymer modified maleated glyceride oil copolymer having an Acid No. above 30, the copolymer produced by maleating glyceride oil in the absence of volatile organic solvent and water to form a maleated oil adduct, and then copolymerizing ethylenic monomers with the adduct to form the copolymer, the copolymer being disposed in water and crosslinked in the aqueous phase with a low molecular weight diepoxide resin having an equivalent weight between 100 and 5000, the microgel containing by weight between 1% and 80% addition polymer of copolymerized ethylenic monomer, between 1% and 50% coreacted maleic anhydride, and between 5% and 95% coreacted unsaturated fatty acid glyceride oil, with the balance being the crosslinking diepoxide resin;

the microgel produced by heat reacting the addition polymer modified maleated glyceride oil copolymer with the diepoxide to form the aqueous dispersed crosslinked microgel particles having a mean particle size below about 5 microns.

2. The coating composition of claim 1 where the addition polymer modified maleated copolymer is produced from an unsaturated fatty acid glyceride having an iodine value between 10 and 250 heat reacted with maleic anhydride and copolymerizing the ethylenic monomers with the maleated oil adduct in the absence of organic solvent and water, where the ethylenic monomers comprise by weight between 50% and 100% styrene.

3. The coating composition of claim 2 where the addition polymer modified maleated copolymer is dispersed into water and then heat reacted with the diepoxide.

4. The coating composition of claim 1 where the maleated oil adduct is dispersed into water followed by emulsion copolymerizing the water dispersed maleated oil adduct with the ethylenic monomer to produce an emulsion copolymerized maleated copolymer, where the ethylenic monomers copolymerized by weight is between 50% and 100% styrene to form an emulsion copolymer.

5. The coating composition of claim 4 where the emulsion copolymer is subsequently heat reacted with the diepoxide.

6. The coating composition of claim 1 where the microgel composition comprises by weight between 30% and 95% coreacted glyceride oil, between 10% and 30% coreacted maleic anhydride, between 5% and 30% copolymerized ethylenic monomer, with balance being crosslinking diepoxide.

7. The coating composition of claim 1 where the addition copolymer modified maleated glyceride oil copolymer is crosslinked with low molecular weight diepoxide resin having a number average molecular weight between 200 and 5000 and an epoxide equivalent weight between 100 and 2500 to form the aqueous dispersed crosslinked microgel particles.

8. The coating composition of claim 7 where the diepoxide crosslinking resin has a molecular weight between 360 and 1,000.

9. The coating composition of claim 7 where the diepoxide has an epoxide equivalent weight between 100 and 1,000.

10. The coating composition of claim 1 where the diepoxide contains two or more terminal epoxide groups.

11. In a process for producing an aqueous dispersed coating composition containing an aqueous dispersed polymeric binder, the process steps comprising:

providing a carboxyl functional, addition polymer modified maleated glyceride oil copolymer having an Acid No. between 30 and 300 and comprising by weight between 5% and 95% coreacted glyceride oil, between 1% and 50% coreacted maleic anhydride, between 1% and 80% addition copolymerized ethylenic monomer, said copolymer produced by forming a maleated glyceride oil in the absence of volatile organic solvent and water, and then copolymerizing with ethylenic monomer, where the copolymer is disposed in water;

adding low molecular weight dipoxide having an epoxide equivalent weight between 100 and 5000 to the water disposed copolymer; and crosslinking the carboxyl functional copolymer with diepoxide to produce stabilized, aqueous dispersed, microgel polymer particles, having a mean particular size less than 5 microns.

12. The process of claim 11 where the addition polymer modified maleated glyceride oil copolymer is produced by:

reacting unsaturated fatty acid glyceride oil having an iodine value between 10 and 250 with maleic anhydride to form a maleated glyceride oil;

addition polymerizing ethylenic monomer with the maleated glyceride oil in the absence of organic solvent and water to form the addition polymer modified maleated glyceride oil copolymer; and dispersing the copolymer into water to form a water dispersed copolymer for crosslinking with the diepoxide.

13. The process of claim 12 where the diepoxide is mixed with the water dispersed copolymer and heat reacted to form aqueous dispersed microgel polymer particles.

14. The process of claim 11 where the ethylenic monomer copolymerized comprises by weight between 50% and 100% styrene.

15. The process of claim 11 where the addition polymer modified maleated glyceride oil copolymer is produced by:

reacting unsaturated fatty acid glyceride oil having an iodine value between 10 and 250 with maleic anhydride to form the maleated glyceride oil;

dispersing the maleated glyceride oil into water; and emulsion copolymerizing ethylenic monomer to form an emulsion copolymer of addition polymer modified maleated glyceride oil.

16. The process of claim 15 where diepoxide is mixed into the emulsion copolymer and heat reacted to form aqueous emulsion copolymer microgel polymer particles.

17. The process of claim 15 where the ethylenic monomer comprises by weight between and 100% styrene.

* * * * *